United States Patent [19]

Knöfel et al.

[11] 4,094,907

[45] June 13, 1978

[54] PROCESS FOR THE PREPARATION OF POLYAMINES

[75] Inventors: Hartmut Knöfel, Leverkusen; Günther Ellendt, Krefeld, both of Germany

[73] Assignee: Bayer Aktiengesellschaft, Leverkusen, Germany

[21] Appl. No.: 751,626

[22] Filed: Dec. 17, 1976

[30] Foreign Application Priority Data

Dec. 19, 1975 Germany ............................. 2557500

[51] Int. Cl.$^2$ ............................................. C07C 85/24
[52] U.S. Cl. ............................. 260/570 D; 260/570.9; 560/19
[58] Field of Search ....................... 260/471 R, 570 D; 560/19

[56] References Cited

U.S. PATENT DOCUMENTS

| | | | |
|---|---|---|---|
| 3,478,099 | 11/1969 | Ross et al. | 260/570 |
| 3,931,320 | 1/1976 | Eifler et al. | 260/570 |
| 3,952,042 | 4/1976 | Knofel | 260/570 X |
| 3,996,283 | 12/1976 | Knofel | 260/570 |
| 4,014,914 | 3/1977 | Pistor et al. | 260/570 X |

*Primary Examiner*—Robert V. Hines
*Attorney, Agent, or Firm*—Gene Harsh; Joseph C. Gil; R. Brent Olson

[57] ABSTRACT

The instant invention is directed to a process for the preparation of multinuclear aromatic polyamines by condensation of aromatic amines with formaldehyde in the presence of aqueous acid catalysts followed by neutralization of the catalyst and processing of the resulting reaction mixture in known manner, characterized in that free amine is removed from the reaction mixture leaving the last condensation stage by means of a hydrophobic solvent, optionally after partial neutralization of the catalyst but before neutralization of the total quantity of catalyst put into the process, and the amine thus removed is returned to the catalyst-containing aqueous phase by return of the resulting amine-containing solvent phase into said aqueous, catalyst-containing phase at any point before the last condensation stage.

16 Claims, 4 Drawing Figures

PROCESS FOR THE PREPARATION OF POLYAMINES

BACKGROUND OF THE INVENTION

Numerous processes are already known for the preparation of arylamine/formaldehyde condensates, and in particular aniline/formaldehyde condensates, by reaction in the presence of aqueous acid catalysts followed by processing of the condensation mixture by distillation after neutralization of the catalyst and removal of the organic phase. Polyamines based on diphenylmethane which are obtainable by these processes are used primarily as starting materials for preparation of the corresponding polyisocyanates. Among the polyisocyanate mixtures based on diphenylmethane series used in polyurethane chemistry, those which contain a high proportion of 4,4'-diisocyanatodiphenylmethane and a low proportion of o-isomers such as 2,2'- or 2,4'-diisocyanatodiphenylmethane are particularly valuable starting materials. The diamine content of the polyamine mixtures obtained by arylamine/formaldehyde condensation can be controlled by suitable choice of the ratio of arylamine to formaldehyde put into the process. The o-isomer content of the polyamine mixtures particularly the amount of 2,2'- or 2,4'-isomers in these mixtures, is primarily a function of the strength and concentration of the acid catalyst used. A high degree of protonation (degree of protonation = percentage of total quantity of nitrogen atoms present as ammonium groups) generally leads to an increased proportion of p-isomers in the end product of the process. One disadvantage of a high degree of protonation, however, is that it inevitably requires a greater effort for neutralization of the reaction mixture. The disadvantage of preparing polyamine mixtures containing a high proportion of diamines by using a large excess of arylamine as starting material is the increased distillation required to remove unreacted amine.

BRIEF DESCRIPTION OF THE DRAWINGS

The Drawings schematically set forth various embodiments of the instant invention.

DESCRIPTION OF THE INVENTION

Figure 1:
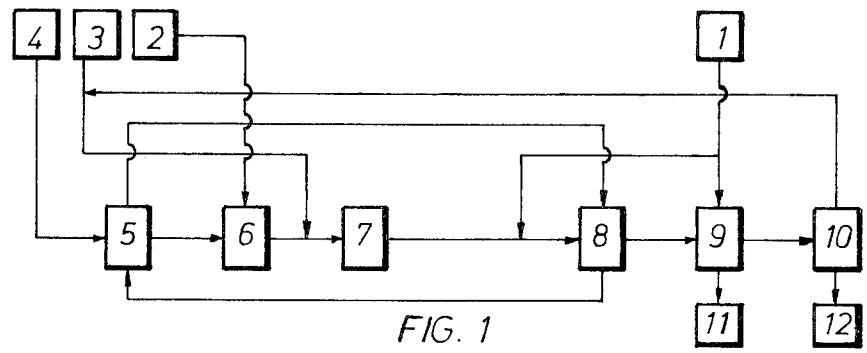

The present invention is directed to a process for the preparation of multinuclear aromatic polyamines by condensation of aromatic amines with formaldehyde in the presence of aqueous acid catalysts, followed by neutralization of the catalyst and known methods of processing the resulting reaction mixture, characterized in that amine is removed from the reaction mixture leaving the final condensation stage by means of a hydrophobic solvent, optionally after partial neutralization of the catalyst but before neutralization of the total quantity of catalyst put into the process, and the amine thus removed is returned to the aqueous phase containing the catalyst by returning the resulting solvent phase which contains amine into the aqueous catalystcontaining phase at any point before the final condensation stage.

The present invention provides a new and improved process for arylamine/formaldehyde condensation, which has, in particular, the following advantages:

(1) The process according to the invention makes it possible to prepare polyamines based on diphenylmethane having an increased diaminodiphenylmethane content without the disadvantage attached to the known process of the art of requiring a greater amount of distillation.

(2) The process according to the invention makes it possible to prepare polyamines based on diphenylmethane which have a greatly reduced o-isomer content even when the arylamines used as starting material have only a moderate degree of protonation.

(3) Lastly, the process according to the invention also makes it possible to prepare polyamines based on diphenylmethane containing a reduced proportion of unwanted by-products and, particularly, of secondary amines which interfere with the subsequent conversion into the corresponding polyisocyanates by phosgenation, for example aminobenzylamines.

More particularly, the instant invention is directed to a process for the preparation of multi-nuclear aromatic polyamines which comprises the steps of (a) condensing an aromatic amine with formaldehyde in the presence of an aqueous acid catalyst in one or more condensate stages to provide an aqueous condensation mixture, (b) extracting the aqueous condensation mixture with a hydrophobic solvent to provide an organic phase containing said aromatic amine and an aqueous phase, (c) recovering polyamine from said aqueous phase, and (d) returning said organic phase to step (a).

Additionally, the instant invention is directed to a process for the preparation of multi-nuclear aromatic polyamines which comprises the steps of (a) condensing an aromatic amine with formaldehyde in the presence of an aqueous acid catalyst in one or more condensate stages to provide an aqueous condensation mixture, (b) extracting the aqueous condensation mixture with a hydrophobic solvent to provide an aqueous phase and an organic phase containing aromatic amine and said hydrophobic solvent, (c) recovering polyamine from said aqueous phase, (d) extracting said organic phase with a second aqueous phase to provide a solvent phase containing said hydrophobic solvent and a third aqueous phase containing aromatic amine, and (e) returning said third aqueous phase to step (a).

Relative to this embodiment, it is preferred that the solvent phase of step (d) be returned to step (b).

Regardless of the embodiment chosen, the condensation reaction can be conducted in more than one stage. If it is so conducted, step (b) of either embodiment is conducted prior to the final condensation stage. Additionally, it is possible to partially neutralize the acid catalyst prior to extracting step (b).

The various possible embodiments of the process according to the invention will now be explained with reference to FIGS. 1 to 4 of the accompanying drawings in which the various reference numerals have the following meaning:

(1) a tank for alkalizing liquor, preferably aqueous alkalizing liquor.

Figure 2:
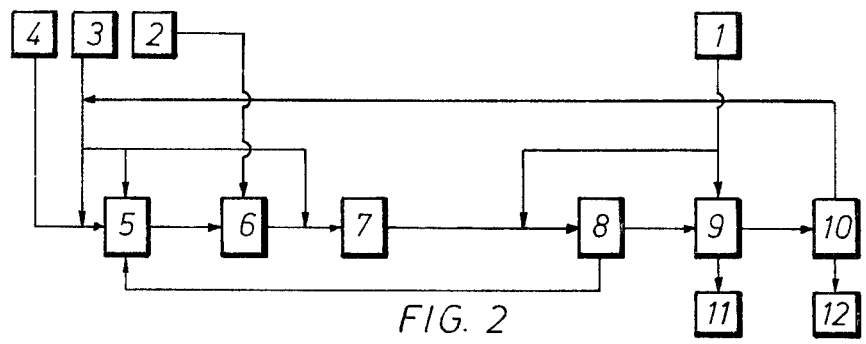
Figure 3:
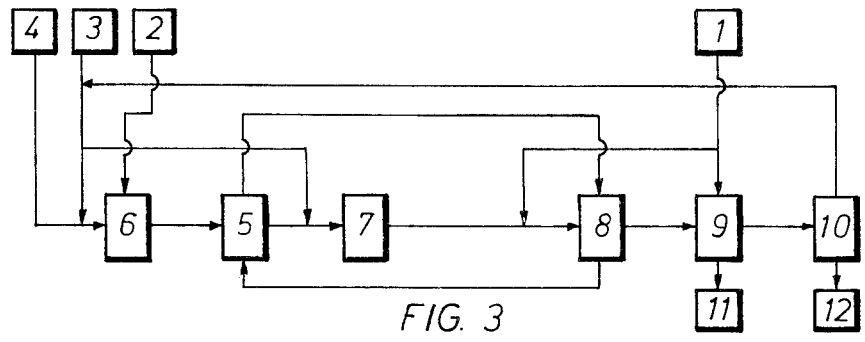
Figure 4:
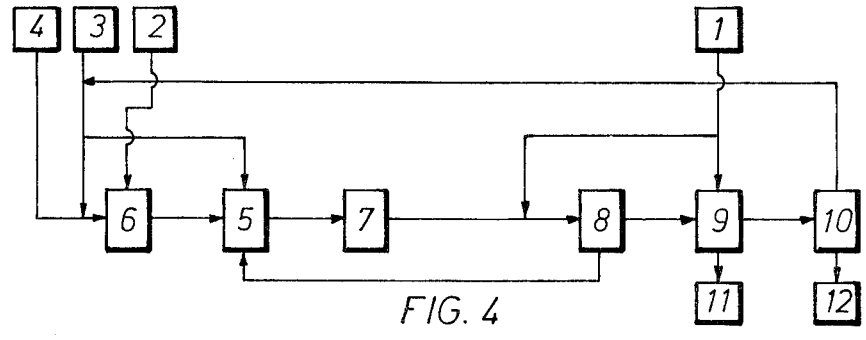

(2) a tank for aqueous formalin solution;

(3) a tank for arylamine used as starting material, preferably aniline;

(4) a tank for aqueous acid catalyst, preferably hydrochloric acid;

(5) an extractor (FIGS. 1 and 3) or a mixer (FIGS. 2 and 4);

(6) the first condensation reactor;

(7) the final condensation reactor;
(8) an extractor (FIGS. 1 and 3) or a separator (FIGS. 2 and 4);
(9) a neutralization stage;
(10) a distillation stage;
(11) a tank for effluent;
(12) a tank for end product.

Except for the extractors and mixer/separators, the apparatus in FIGS. 1 to 4 are the usual apparatus used in the art for carrying out arylamines/formaldehyde condensation in the presenxe of aqueous acid catalysts by a preferably, two-stage condensation reaction followed by neutralization and processing of the end product by distillation. The characterizing feature of the present invention is that the single or multistage condensation process already known in the art, for example as outlined in U.S. Pat. No. 3,476,806, has been modified to the effect that free amine contained in the condensation mixture leaving the last stage of condensation is removed at 8 by means of a hydrophobic solvent and returned to the aqueous phase at 5.

In a first embodiment of the process according to the invention, as shown in FIG. 1 of the accompanying drawings, free amine present in the aqueous system leaving the final reactor 7 is removed in an extractor 8 by means of a hydrophobic solvent, optionally one containing amine, optionally after partial neutralization. The resulting solvent phase which is enriched with amine is thenn transferred to another extractor 5 where it is extracted with aqueous catalyst from the tank 4. In the first embodiment of the process according to the invention, the extractor 5 is arranged in front of the first condensation stage. The solvent leaving the extractor 5 is then returned to extractor 8. Processing according to this first embodiment of the process affords the following advantages: (1) Preparation of polyamines based on diphenylmethane containing an increased proportion of diamines can be achieved without increase in the amount of distillation required since the excess arylamine used as starting material which is fed into the systemm before and/or after the first condensation stage, leaves the last reactor 7 to be returned to the beginning of the process through 8 and 5 without entering into the distillation stage 10.

(2) Extraction in the extractor 8 removes from the system not only unreacted starting arylamines but, according to the degree of protonation at the entry into the extractor 8, it also advantageously removes unreacted intermediate product containing secondary amino groups and o-isomeric products of the process which, after their return to the beginning of the process undergo preferential reaction. This makes it possible to prepare polyamines based on diphenyl methane which have a comparatively low o-isomer content without at the same time having to operate with a very high degree of protonation. This advantage entails the further advantage of reducing the proportion of secondary diamines in the products of the process.

The process according to the invention, may of course, be carried out with a degree of protonation close to 100% if it is desired to produce polyamines based on diphenylmethane having an exceptionally low o-isomer content. In that case, however, it is advisable to subject the aqueous phase leaving the last reactor 7 to partial neutralization before it enters extractor 8 in order to increase the efficiency of extractor 8.

The advantages which can be obtained by carrying out the first embodiment of the process according to the invention are also obtained with the second (see FIG. 2), third (see FIG. 3) and fourth embodiments (see FIG. 4).

The second embodiment of the process according to the invention differs from the first embodiment solely by the fact that a mixer 5 separator (or extractor) 8 combination is used instead of the extractors 5 and 8 of the first embodiment. This means that in the second embodiment, the amine-containing solvent which is mixed at 5 with aqueous hydrochloric acid from tank 4 and optionally starting arylamine from tank 3 remains as second phase in the reaction mixture which is passed through the condensatiion reactors 6 and 7. The two phases are then again separated in extractor 8, optionally after partial neutralization of the catalyst.

The condensation reaction may also be carried out as a single stage reaction, in particular when the process according to the invention is carried out according to the first or second embodiment, since the solvent phase leaving the extractor or phase separator 8 is in any case combined with starting components in 5, in particular with formaldehyde, in contrast to the third and fourth embodiments described below, in which the extractor or mixer 5 is situated behind the first and before the final condensation stage so that it is essential to employ at least two stages.

In principle, the amine containing solvent from the extractor or phase separator 8 could be mixed with the aqueous phase after the first condensation stage 6 and before the final condensation stage 7. This principle is applied to the third embodiment in which, as in the first embodiment, hydrophobic solvent is carried in a separate cycle through extractors 5 and 8. The same principle is also applied in the fourth embodiment, which differs from the third embodiment solely in using a mixer 5 and separator 8 as in the second embodiment instead of extractors 5 and 8. The advantages described for the first embodiment are also obtained when employing the third and fourth embodiments.

The process according to the invention may be carried out with any aromatic amines, for example aniline; o-toluidine; m-toluidine; N-methylaniline; N-ethylaniline; 2,6-dimethyl aniline; 2,6-diethylaniline; 2,6-diisopropylaniline; 2,4-diaminotoluene and any mixtures of such amines. Suitable arylamines also include, for example, anthranilic acid alkyl esters having from 1 to 4 carbon atoms in the alkyl group. The arylamine preferably used in the process according to the invention is aniline.

The acids used in the process according to the invention, are, in particular water-soluble acids having a pKA-value below 2.5 and preferably below 1.5, for example hydrochloric acid; phosphoric acid; sulphuric acid; methane sulphonic acid; trifluoromethane sulphonic acid or hydrobromic acid. The preferred catalyst is hydrochloric acid. The above mentioned acids may also be used as mixtures with acid or neutral salts of such acids, for example the corresponding ammonium or alkali metal salts.

The hydrophobic solvents used for the process according to the invention may be any solvents which are immiscible with water and inert towards the reactants and boil within a range of about 30° C to 250° C and preferably 80° C to 200° C. Examples of particularly suitable solvents include chlorobenzene; dichlorobenzenes; benzene; toluene; the xylenes; dichloroethane; chloroform; carbon tetrachloride and the like. The preferred solvent is o-xylene. The solvents are used for the extraction in a proportion by weight of acid condensation mixture to solvent of between 10:1 and 1:10, preferably between 2:1 and 1:3.

The formaldehyde used as starting material in addition to aromatic amines in the process according to the invention is preferably in the form of an aqueous formalin solution.

At the beginning of the condensation reaction (entry to reactor 6, the aniline/formaldehyde molar ratio ("aniline" is used here and below to refer to any of the above mentioned amines used as starting material) is generally between 1:1 and 20:1 and preferably between 2:1 and 5:1. If desired, this ratio may be increased by further addition of amine from tank 3 during the reaction, in particular between reactors 6 and 7.

The volumetric ratio of aniline + formaldehyde to water at the beginning of the condensation reaction is generally between 2:1 and 25:1. This ratio, however, is not of major significance for carrying out the process of the invention.

In the process according to the invention, the degree of protonation at the entry into the first condensation stage 6 is generally between 10 and 100%, preferably between 70 and 100%. In embodiments 1 and 2, it may if desired be lowered between the individual condensation stages 6 and 7 by further addition of starting arylaminne from tank 3. In embodiments 3 and 4, the degree of protonation of the aqueous phase leaving the first reactor 6 is inevitably reduced by admixture with free amine. In general, the degree of protonation at the entry into the final reactor 7 is between 30 and 100%, preferably 30 and 70%, in the embodiments of the process according to the invention.

A factor which is of major importance in the process according to the invention is the degree of protonation at the entry into the extractor or phase separator 8 because the quantity of free amine returned to 5 depends primarily on this degree of protonation. The degree of protonation at the entry to 8 is generally between 20 and 80% and may, if necessary, be adjusted by the addition of alkalizing agent from tank 1.

The solvent leaving extractor 5 in the first and third embodiment generally has a free amine content of not more than 60% and preferably 0 to 30%.

The process according to the invention is preferably carried out as a two-stage rearrangement (reactors 6 and 7). The reaction in reactor 6 is generally the formation of singly N-substituted intermediate products which are then rearranged to the desired end product in reactor 7. It may sometimes be indicated to reduce the degree of protonation of the aqueous reaction mass leaving reactor 6 by a further addition of starting arylamine.

The following temperatures are preferably employed in the process according to the invention: The temperature in the extractor or mixer 5, particularly when 5 is arranged in front of reactor 6, is generally maintained at 0° to 60° C, preferably 20° to 40° C. If 5 is arranged in front of 7, the temperature in 5 is also preferably within this range but may in principle be raised to the temperature in 7.

The temperature in the reactor 6 is generally kept at 0° to 60° C, preferably 20° to 40° C, particularly if the process is carried out in at least two stages, whereas in the one-stage embodiment of the process illustrated in FIGS. 1 and 2 the temperature in reactor 6 is 30° to 100° C, preferably 60° to 100° C (in that case reactor 7 may be omitted).

The temperature in reactor 7 is generally 60° to 110° C preferably 80° to 100° C.

The temperature in extractor or separator 8 is generally between 60° and 110° C, preferably 80° and 100° C.

In the process according to the invention, the aqueous phase leaving the extractor or phase separator 8 is treated with neutralizing agent in known manner to neutralize the catalyst using any compound which is basic in reaction but preferably aqueous sodium or potassium hydroxide and, after phase separation 9, it is separated into effluent discharged into the effluent tank 11 and organic phase which is transferred to distillation stage 10. In distillation stage 10, the organic phase is then separated in known manner into unreacted arylamine put into the process as starting material and end product which is collected for storage in tank 12.

The nature of the apparatus used in the process according to the invention is not an essential part of the invention. The apparatus may include, for example, the known tube reactors and liquid extractors, mixers and phase separators used in chemical processes.

The process according to the invention may, of course, also be carried out quite independently of the apparatus which have merely been shown by way of example in the drawings. This means in particular that any steps of the process (precondensation, rearrangement reaction, mixing, phase separation or extraction) may be carried out as single stage or multistage operations.

It should be recognized that although the term "one or more condensate stages" is used throughout the instant specification and claim, the reaction sequence occurs as follows (aniline and formaldehyde are shown for simplification):

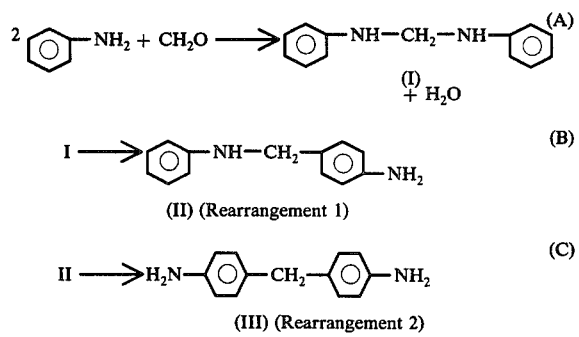

The three reactions can occur in essentially one stage or in multiple stages.

EXAMPLES

EXAMPLE 1 (FIG. 1)

In a continuously operating experimental laboratory installation, stream (A) consisting of dilute hydrochloric acid from 4 is mixed with stream (C) from 8 in the cooled mixer of an extractor 5 designed as mixer-separator unit. In the following separator, the resulting mixture is separated into an organic phase and an aqueous phase.

The aqueous phase from 5 enters reactor 6 comprising of three stirrer vessels. In the first vessel, it is reacted with stream (B) consisting of 30% aqueous formalin solution at a temperature kept at 35° to 40° C.

The condensation solution leaving reactor 6 is mixed with 1150 g/h of aniline before it is transferred to a second reactor 7 also consisting of three stirrer vessels, where it is heated to boiling to complete the reaction.

In the following extraction column 8 consisting of five to six stages, the completely reacted mixture is extracted at 90° to 95° C by the xylene phase separated at 5. The extract is returned to the mixer of 5 as stream C.

| (in g/h) Stream (A) | 437 hydrogen chloride |
| --- | --- |
| | 1850 water |
| Stream (B) | 75 formaldehyde |
| | 175 water |
| Stream (C) | 4800 o-xylene |
| | 1200 aniline and polyarylamine |

The aqueous phase from 8 is then processed in the usual manner by neutralization in 9 with excess aqueous sodium hydroxide solution from 1, discharge of the sodium chloride solution to 11 and separation of the organic phase from 9 by distillation in distillation stage 10 into aniline which also contains xylene carried along with it and condensation product.

The product obtained in this example of the process according to the invention and collected at 12 (about 480 g/h) has an average diaminodiphenylmethane content of 88–90% by weight, more than 99% by weight of which consists of the 4,4'-isomer.

EXAMPLE 2 (FIG. 2)

In a continuously operating experimental laboratory installation, stream (A) consisting of dilute hydrochloric acid 4 is mixed with stream (C) from 8 in a cooled mixer 5. About 50 g/h of aniline are added to ensure a slight excess of amine equivalents over acid equivalents (about 3 to 5%).

The diphasic mixture is transferred from mixer 5 into the first reactor 6 consisting of three stirrer vessels, into which stream (B) consisting of a 30% aqueous formalin solution is also introduced, and the temperature is kept at 35° to 40° C during the reaction.

1560 g/h aniline are added to the condensation mixture leaving reactor 6 and the mixture is then transferred to a second reactor 7 also consisting of three stirrer vessels, where it is heated to boiling to complete the reaction.

In a following separator (8), the xylene phase which contains amine is separated off at about 90° C and returned to 5 as stream (C).

| (g/h) Stream (A) | 437 hydrogen chloride |
| --- | --- |
| | 1850 water |
| Stream (B) | 75 formaldehyde |
| | 175 water |
| Stream (C) | 5880 o-xylene |
| | 1120 aniline and polyarylamines |

The aqueous phase from 8 is then processed in the usual manner by neutralization in 9 with excess aqueous sodium hydroxide solution from 1, separation of the sodium chloride solution and its discharge into 11 and separation of the organic phase from 9 by distillation in distillation stage (10) into aniline, which also contains xylene carried along with it, and condensation product.

In the above described example of the process according to the invention, the product obtained and collected in 12 (about 480 g/h) has an average diaminodiphenyl methane content of 93 to 95% by weight, of which 96 to 97% by weight consists of the 4,4'-isomer.

EXAMPLE 3 (FIG. 3)

In a continuously operating experimental laboratory installation, stream (A) consisting of an aqueous hydrochloric acid solution of aniline prepared by mixing dilute hydrochloric acid from 4, with aniline from 3 and stream (B) consisting of 30% formalin solution are continuously introduced into reactor consisting of three stirrer vessels and the temperature in reactor 6 is kept at 35° to 40° C. The two streams have the following composition (in g/h):

| Stream (A) | 1400 aniline |
| --- | --- |
| | 525 hydrogen chloride |
| | 1860 water |
| Stream (B) | 90 formaldehyde |
| | 210 water |

The aqueous reaction mixture from reactor 6 enters an extraction column 5 where it is carried in countercurrent to the aniline-xylene mixture obtained as the organic discharge from extraction column 8, and in the course of a three-stage extraction process at 40° C, it substantially absorbs all the amine contained in this organic phase.

The aqueous phase leaving extractor 5 after it has been enriched with aniline is then transferred to reactor 7 also consisting of three stirrer vessels, in which it is heated to 95° C to complete the reaction. It is then transferred to extractor 8.

In the three-stage extraction column 8, aniline not bound in the form of salt and therefore still extractable is removed from the aqueous reaction solution at 90° to 95° C by means of the xylene phase (about 2800 g/h) obtained in 5, which has only a low aniline content, and the xylene phase now enriched with aniline is returned to 5.

To charge up the xylene cycle during the starting phase, free aniline is supplied (1400 g/h) to the aqueous phase between 5 and 7 until the cycle via 8 and 5 is full or the extractable quantity of aniline in 8 is increased by partial neutralization of the aqueous phase between 7 and 8 with aqueous sodium hydroxide solution (1–2 mol/h).

The quantity of xylene entering at 8 (about 5.5 to 6 kg/hour) is calculated so that the discharged organic phase has an aniline content of about 20% and the condensation products will therefore amount to less than 2%.

The aqueous phase is then processed in the usual manner at 9 by neutralization with excess sodium hydroxide solution from 1, discharge of the sodium salt solution to 11 and separation of the organic phase from 9 by distillation in distillation stage 10 into aniline, which also contains xylene washed into it, and condensation product.

The product obtained in this example of the process of the invention and collectd at 12 (about 600 g/h) has an average diaminodiphenylmethane content of from 94 to 96% by weight, about 95% by weight of which consists of the 4,4'-isomer.

EXAMPLE 4 (FIG. 4)

In a continuously operating experimental laboratory installation, stream (A) consisting of an aqueous hydrochloric acid solution of aniline prepared by mixing dilute hydrochloric acid from 4 and aniline from 3 and stream (B) consisting of 30% formalin solution are continuously introduced into reactor 6 consisting of three stirrer vessels and the temperature in reactor 6 is kept at 35° to 40° C. The two streams have the following composition (in g/h):

| Stream (A) | 1160 aniline |
| | 437 hydrogen chloride |
| | 1800 water |
| Stream (B) | 90 formaldehyde |
| | 210 water |

The aqueous reaction mixture from reactor 6 is vigorously mixed in a mixer 5 with the amine containing organic phase (stream (C)) separated in separator 8 and 450 g/h of aniline. To complete the reaction, the mixture is subsequently heated to about 95° C in reactor 7 which also consists of three stirrer vessels. When the reaction is completed, the organic phase is separated as stream (C) at about 90° C in the separator 8 following the reactor 7, and it is then returned to 5. Stream (C) has the following average composition (in g/h):

| Stream (C) | 5900 o-xylene |
| | 1100 aniline and polyarylamine. |

The organic phase is subsequently processed in the usual manner by neutralization 9 and distillation in 10 as already described in Example 3.

The product obtained in this example of the process according to the invention (about 570 g/h) has an average diaminodiphenylmethane content of 90 to 92% by weight, about 95% by weight of which consists of 4,4'-isomer.

What is claimed is:

1. A process for the preparation of multinuclear aromatic polyamines by condensation of aromatic amines with formaldehyde in the presence of aqueous acid catalysts followed by neutralization of the catalyst and processing of the resulting reaction mixture in known manner, characterized in that free amine is removed from the reaction mixture leaving the last condensation stage by means of a hydrophobic solvent, optionally after partial neutralization of the catalyst but before neutralization of the total quantity of catalyst put into the process, and the amine thus removed is returned to the catalyst-containing aqueous phase by return of the resulting amine-containing solvent phase into said aqueous, catalyst-containing phase at any point before the last condensation stage.

2. A process according to claim 1, characterized in that return of the amine-containing solvent phase to the aqueous phase containing catalyst is carried out in a mixer to form a diphasic mixture which after the last condensation stage is separated in a phase separator into an aqueous phase and the amine-containing solvent phase.

3. Process according to claim 1, characterized in that the condensation reaction is carried out in the absence of hydrophobic solvent in all stages, both the removal of aqueous amine from the aqueous phase leaving the last condensation stage and the return of the resulting amine-containing solvent phase to the aqueous phase before the last condensation stage being carried out by means of solvent contained in a separate cycle and with the aid of extractors.

4. A process according to claim 1 characterized in that the amine-containing solvent is mixed with the aqueous catalyst-containing phase before the first condensation stage.

5. A process according to claim 1 characterized in that the amine-containing solvent phase is mixed with the aqueous, catalyst-containing phase after the first condensation stage.

6. A process for the preparation of multi-nuclear aromatic polyamines which comprises the steps of
 (a) condensing an aromatic amine with formaldehyde in the presence of an aqueous acid catalyst in one or more condensate stages to provide an aqueous condensation mixture,
 (b) extracting the aqueous condensation mixture with a hydrophobic solvent to provide an organic phase containing said aromatic amine and an aqueous phase,
 (c) recovering polyamine from said aqueous phase, and
 (d) returning said organic phase to step (a).

7. The process of claim 6 wherein step (a) is conducted in two or more condensate stages.

8. The process of claim 7 wherein step (d) comprises returning said organic phase to step (a) at any stage before the final condensation stage.

9. The process of claim 6, wherein prior to step (b) said catalyst is partially neutralized.

10. The process of claim 6, wherein the degree of protonation of the aqueous condensation mixture upon entering step (b) is from 20 to 80 percent.

11. A process for the preparation of multi-nuclear aromatic polyamines which comprises the steps of
 (a) condensing an aromatic amine with formaldehyde in the presence of an aqueous acid catalyst in one or more condensate stages to provide an aqueous condensation mixture,
 (b) extracting the aqueous condensation mixture with a hydrophobic solvent to provide an aqueous phase and an organic phase containing aromatic amine and said hydrophobic solvent,
 (c) recovering polyamine from said aqueous phase,
 (d) extracting said organic phase with a second aqueous phase to provide a solvent phase containing said hydrophobic solvent and a third aqueous phase containing aromatic amine, and
 (e) returning said third aqueous phase to step (a).

12. The process of claim 11 further comprising (f) returning said solvent phase to step (b).

13. The process of claim 11 wherein step (a) is conducted in two or more condensate stages.

14. The process of claim 13 wherein step (d) comprises returning said organic phase to step (a) at any stage before the final condensation stage.

15. The process of claim 11, wherein prior to step (b), said catalyst is partially neutralized.

16. The process of claim 11, wherein the degree of protonation of the aqueous condensation mixture upon entering step (b) is from 20 to 80 percent.

* * * * *